Aug. 14, 1951  W. H. ANDERSON  2,564,555
CROP SPRAYING ATTACHMENT FOR AIRPLANES
Filed Sept. 13, 1949  2 Sheets-Sheet 1
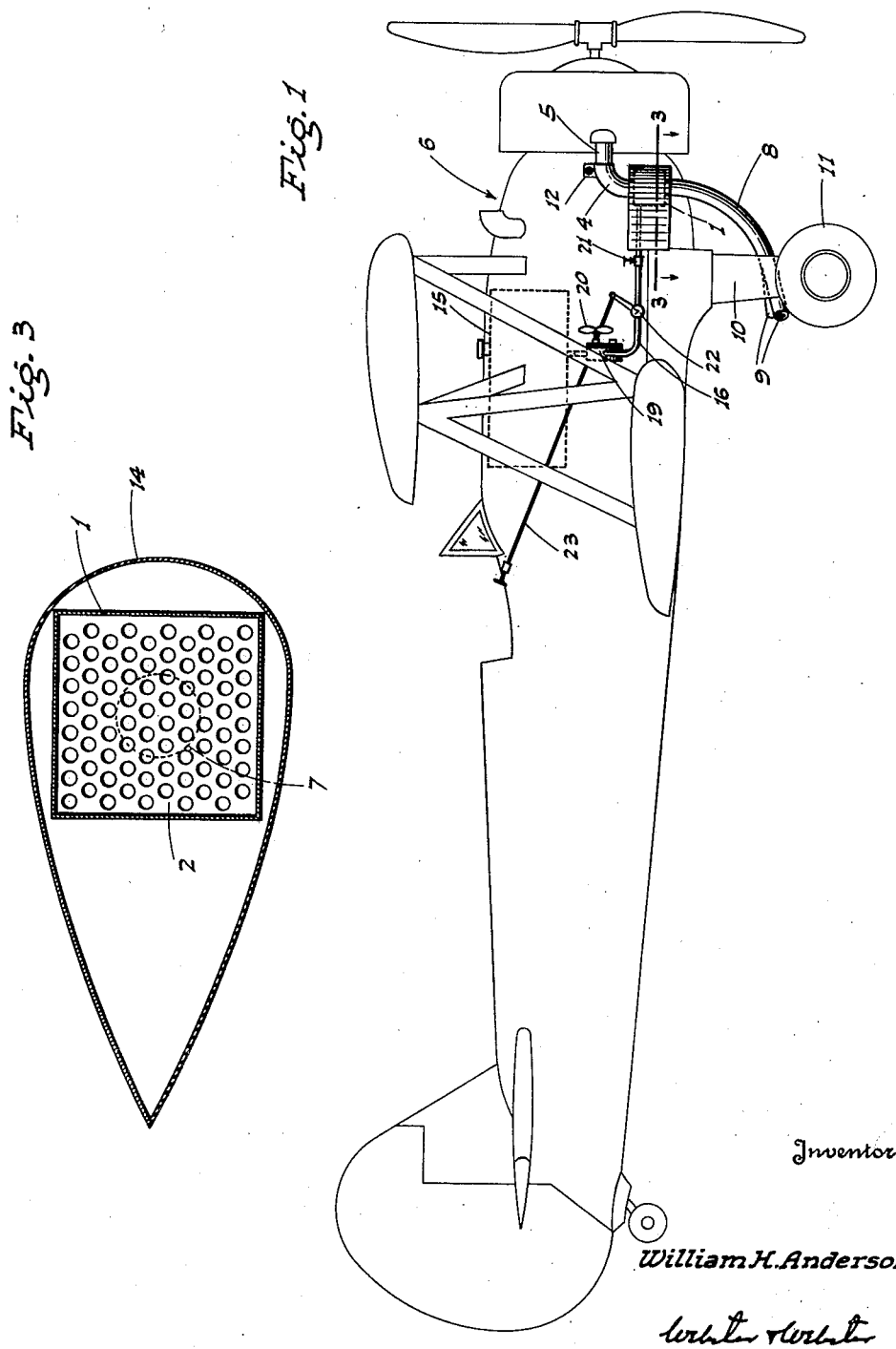
Inventor
William H. Anderson
ATTORNEYS

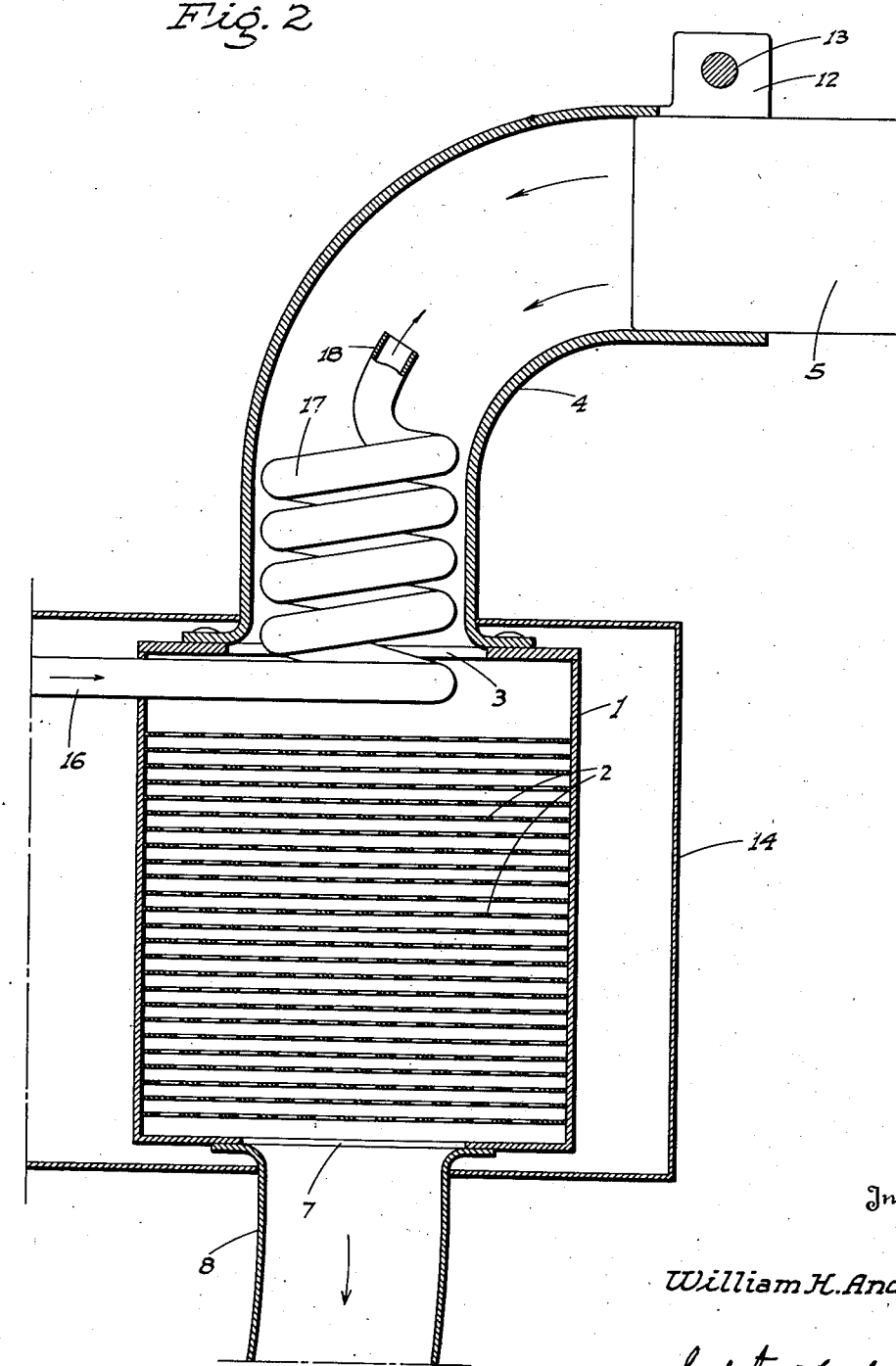

Patented Aug. 14, 1951

2,564,555

UNITED STATES PATENT OFFICE 2,564,555

CROP SPRAYING ATTACHMENT FOR AIRPLANES

William H. Anderson, Stockton, Calif.

Application September 13, 1949, Serial No. 115,527

8 Claims. (Cl. 244—136)

1

This invention relates to crop spraying by airplane, and particularly to the use of liquid sprays for the control of insects or diseases of orchard trees, vines, etc.

The major object of my invention is to provide an attachment adapted to be mounted on an airplane and operatively connected to a supply of spray liquid and to the exhaust pipe of the engine of the airplane and so arranged and constructed that the liquid as it feeds into the attachment will be thoroughly heated and then vaporized as it becomes mixed with the exhaust gases; and will be discharged by and with such gases into the airstream in the form of an expanding smoke or fog, so that a very wide and effective distribution of the spray over the area being treated is obtained.

A further object is to provide an attachment for the purpose which may be readily mounted on an airplane without any changes in the initial structural arrangement of the latter being necessary.

A further object of the invention is to produce a practical device and one which will be exceedingly effective for the purpose for which it is designed.

These objects are accomplished by means of such structure and relative arrangement of parts as will fully appear by a perusal of the following specification and claims.

Figure 1 is a side outline of an airplane of the type commonly used for crop spraying purposes and showing my spray-smoke forming attachment mounted thereon in somewhat diagrammatic form.

Figure 2 is a sectional elevation of the vaporizing unit of the attachment.

Figure 3 is an enlarged sectional plan of said unit, on line 3—3 of Fig. 1.

Referring now more particularly to the characters of reference on the drawings, the vaporizer which forms the main unit of the installation comprises a box-like casing 1 having a large number of horizontal vertically separated perforated baffle plates 2 secured therein. At the top, the casing is formed with a central inlet opening 3, about one-half as wide as the casing, and from which a passage member or conduit 4 of L form, extends upwardly and forwardly to connection with the exposed rearwardly facing end of the exhaust pipe 5 of the engine of the airplane 6; pipe 5, member 4, and opening 3 being all about the same size.

Casing 1 is provided at the bottom with an outlet opening 7 from about which a discharge

2 pipe 8 extends downwardly and rearwardly to a termination in the form of laterally branching rearwardly facing unrestricted outlet nozzles 9. These nozzles are preferably located near the top of and back of the strut 10 of one of the landing wheels 11 of the airplane. In order to firmly secure L 4 about pipe 5, said L is preferably slit lengthwise at its forward end and is provided with ears 12 on opposite sides of the slit to receive a transverse clamping bolt 13.

In order to reduce wind resistance, casing 1 is enclosed within a streamlined housing 14.

As will be obvious, member 4, casing 1, and pipe 8 form a continuous passage unit, and the entire flow of exhaust gases from the airplane engine must pass through casing 1 and the perforated baffle plates therein, and thence through the outlet pipe 8 and nozzles 9 into the airstream.

In order to introduce a liquid spray material into such gases and insure that such liquid shall be thoroughly vaporized and mixed with the gases before the latter are discharged to atmosphere, the following arrangement is provided:

A liquid supply tank 15 is mounted in the fuselage of the airplane between the engine and cockpit as usual, and from this tank a pipe 16 leads into casing 1 above the topmost baffle plate and is there bent into the form of a helical coil 17 which extends upwardly into conduit 4 and terminates in a relatively straight outlet 18 disposed centrally in said conduit and facing toward exhaust pipe 5, or in the direction from which the flow of gases come.

In order to insure a steady flow of liquid through pipe 16 and from outlet 18 thereof against the pressure of the gases in conduit 4, a pipe 19 of suitable type, driven by an airstream-actuated propeller 20, is interposed in pipe 16 exteriorly of casing 1.

The volume of flow through pipe 16 is controlled by a suitable manual needle valve 21 interposed in said pipe between the pump 19 and casing 1, while a quick-acting shut-off valve 22 is also interposed in pipe 16 between the pump and valve 21; said valve being operated by a suitable control member 23 extending from the valve to a point convenient of access to the pilot in the cockpit.

From the foregoing description it will be seen that as long as the airplane engine is operating, the coil 17, as well as the baffle plates 2, are maintained in a heated condition by exposure to the exhaust gases moving therepast. Therefore, as the liquid spray material, in quantity depending on the setting of needle valve 21, is fed through pipe 16, it becomes well heated as it passes through coil 17, so that as it discharges into conduit 4 it is already in a condition favorable for ready vaporization. Once in the conduit, the liquid is swept past the coil and through the baffle plates 2 by the exhaust gases, so that by the time such gases reach the outlet pipe 8, the liquid has been completely vaporized and intimately intermingled with the gases through the entire volume thereof.

When the gases discharge from the nozzles 9 and expand into the relatively cool airstream, the vaporized liquid content of the gases condenses and the falling mass of gases assumes a foggy or smoke-like appearance.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired.

1. A crop spraying attachment for airplanes comprising means forming a continuous passage unit constructed and arranged at one end for connection to the discharge end of the exhaust pipe of the engine of an airplane and to terminate at its other end in rearwardly facing relation to the direction of flight of the airplane, means to introduce a liquid spray material into said unit intermediate its ends, and means in said passage unit between the point of introduction of the liquid into the unit and said other end thereof to vaporize and intimately mix the liquid with the exhaust gases passing through the unit.

2. A crop spraying attachment for airplanes comprising means forming a continuous passage unit constructed and arranged at one end for connection to the discharge end of the exhaust pipe of the engine of an airplane and to terminate at its other end in rearwardly facing relation to the direction of flight of the airplane, a pipe extending from a source of liquid spray material on the airplane entering said passage unit and terminating in an open end facing and near said one end of the unit, and means to force liquid through the pipe and into the passage unit.

3. A crop spraying attachment for airplanes comprising means forming a continuous passage unit constructed and arranged at one end for connection to the discharge end of the exhaust pipe of the engine of an airplane and to terminate at its other end in rearwardly facing relation to the direction of flight of the airplane, a pipe extending from a source of liquid spray material on the airplane entering said passage unit and terminating in an open end within said unit intermediate the ends thereof, and means incorporated with said pipe to cause the liquid to be heated by the exhaust gases passing through the unit before the liquid is discharged from said pipe.

4. An attachment as in claim 3, in which said last named means comprises a helical coil formed in the pipe within and extending lengthwise of the unit.

5. An attachment as in claim 2, in which said last named means comprises a pump interposed in the pipe, and an airstream driven power member for operating the pump.

6. A crop spraying attachment for an airplane comprising a passage member constructed and arranged to be disposed in depending relation from and to be connected at its upper end on the discharge end of the exhaust pipe of the engine of an airplane, whereby said member forms an extension of such exhaust pipe, an enlarged casing depending from and communicating with the member, a discharge pipe connected to and depending from the casing in communication therewith, a plurality of perforated spaced baffle plates within said casing through which the gases must pass from the member to the discharge pipe, and means to introduce spray liquid into the member.

7. A crop spraying attachment for an airplane comprising a passage member constructed and arranged to be disposed in depending relation from and to be connected at its upper end on the discharge end of the exhaust pipe of the engine of an airplane, whereby said member forms an extension of such exhaust pipe, an enlarged casing depending from and communicating with the member, a discharge pipe connected to and depending from the casing in communication therewith, a plurality of perforated spaced baffle plates within said casing through which the gases must pass from the member to the discharge pipe, and a pipe leading from a source of liquid spray on the airplane entering the member and terminating in an open end facing the upper end of the member.

8. An attachment as in claim 7, with a helical coil formed in the pipe and disposed within the member below said open end of the pipe.

WILLIAM H. ANDERSON.

REFERENCES CITED

The following references are of record in the file of this patent:

UNITED STATES PATENTS

| Number | Name | Date |
| --- | --- | --- |
| 1,842,844 | Savage | Jan. 26, 1932 |
| 1,892,132 | Berney | Dec. 27, 1932 |